(No Model.)
C. M. PRATT.
FUNNEL.
No. 568,411. Patented Sept. 29, 1896.
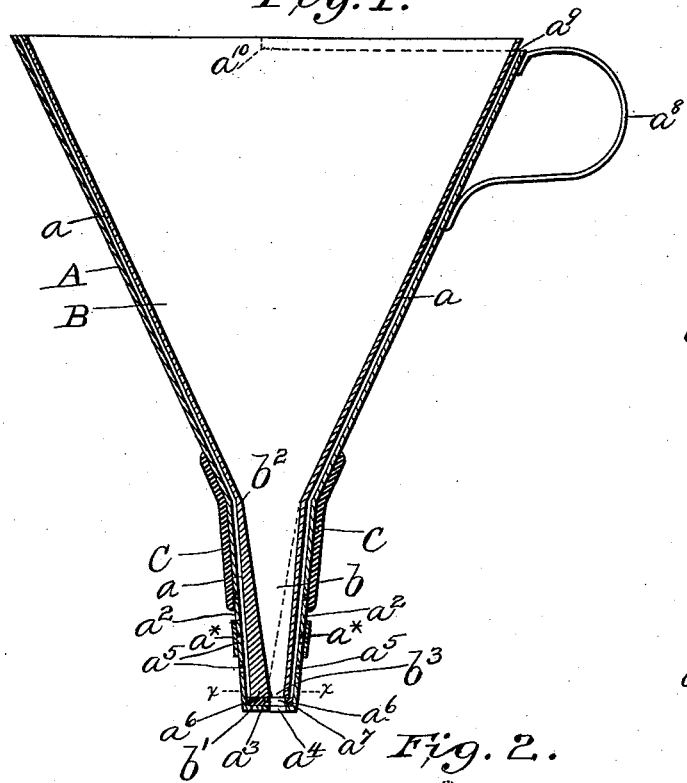
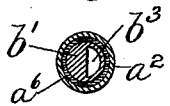
Witnesses
Jos. H. Blackwood
W. B. Camp
Inventor
Charles Manville Pratt
By Geo. V. Myer
Attorney

UNITED STATES PATENT OFFICE.

CHARLES MANVILLE PRATT, OF TOWANDA, PENNSYLVANIA.

FUNNEL.

SPECIFICATION forming part of Letters Patent No. 568,411, dated September 29, 1896.

Application filed April 23, 1896. Serial No. 588,813. (No model.)

*To all whom it may concern:*

Be it known that I, CHARLES MANVILLE PRATT, a citizen of the United States, residing at Towanda, in the county of Bradford and State of Pennsylvania, have invented certain new and useful Improvements in Funnels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in funnels, and has for its object to provide a funnel that is simple and inexpensive in construction, easily manipulated, and which comprises a combined sheet-metal and glass funnel, each of which is capable of being used independently of the other.

It further has for its object to provide a ventilating air-space between the double walls of the funnel and air-holes in the lower portion of the spout of the funnel for the purpose of permitting air to escape while the liquid is running through the funnel into a vessel, and when the liquid in the vessel reaches and covers said air-holes to stop the flow of liquid from the funnel, and also to provide a cut-off or valve in the lower portion of the spout of the funnel to close the same.

My invention consists in the features and combination of features, as more fully hereinafter described and specifically claimed.

Referring to the drawings which illustrate my invention, Figure 1 is a central vertical sectional view of the funnel; Fig. 2, a top plan view; Fig. 3, a cross-section on line $xx$ of Fig. 1; Fig. 4, a plan view of the lower end of the spout.

In the drawings, in which like letters of reference denote like parts throughout the several views, A B are two separable funnels, one situated within the other, and provided with an air-space $a$ between them all around. The outer funnel A is made of tin or any other suitable material, and has a spout $a^2$, the lower end $a^3$ of which is provided with a semicircular aperture $a^4$. The spout $a^2$ is provided with two or more series or rows of air-holes $a^5$ for the purpose of allowing air to escape from a bottle or other vessel as the fluid passes into it from the funnel.

$a^*$ is a soft-rubber band placed around the spout and adapted to slide up or down and cover all but one row of the air-holes $a^5$. Although only one band $a^*$ is shown and described, two or more may be used when desired.

$a^6$ is a circular rubber washer provided with a semicircular aperture $a^7$, corresponding in size to the aperture $a^4$ in the spout.

$a^8$ is the handle of the funnel.

The top edge of the funnel A is cut away for more than half its circumference to form a guideway $a^9$ and also shoulders $a^{10}$ $a^{11}$.

B is the inner funnel, made preferably of glass; but it may be made of any suitable material; $b$, the spout thereof, the inside of which is thickened for a little more than half its diameter at the bottom $b'$, the thick part gradually tapering upward to the point $b^2$, where it is the same thickness as the body of the funnel.

$b^3$ is a nearly semicircular aperture in the lower end of the said spout $b$, a little smaller in size, but is adapted to register with the apertures $a^4$ and $a^7$, so that when the valve is closed the solid part $b'$ of the glass spout will completely cover (and a little more) the aperture $a^4$ in the washer $a^6$.

$b^4$ is a lug formed integrally with the upper edge of the funnel B and extending laterally therefrom and adapted to slide in the guide or way $a^9$. The length of this guide or way $a^9$ must be exactly the width of the lug $b^4$, more than half the circumference of the top edge of the funnel A.

C is a soft-rubber sleeve on the spout $a^2$ of the outer funnel. The said spout is made tapering to adapt it to fit bottles or other vessels having different-sized mouths or openings and make an air-tight joint therewith.

The operation is as follows: The funnel is inserted into the mouth of a bottle or other vessel desired to be filled, and the sleeve C, fitting closely therein, forms an air-tight joint between the mouth of the vessel and the funnel, the lug $b^4$ abutting against the shoulder $a^{10}$, and the aperture $a^4$ being closed the funnel is filled with the desired liquid, and then the inner funnel B is rotated in the direction shown by the arrow until the lug $b^4$ comes in contact with the shoulder $a^{11}$, when the semicircular apertures $b^3$, $a^6$, and $a^4$ will register and allow the contents of the funnel to flow out until the liquid rises up in the bottle or other vessel and covers the row of air-holes not covered by the band $a^*$, when it will stop flowing, even though the funnel may yet be part full, and thus it need not be watched to keep it from overflowing. The funnel B is then turned until the lug $b^4$ comes in contact with the shoulder $a^{10}$, when the openings $a^7$ $a^4$ will be closed by the thickened portion $b'$ of the funnel B sliding over and covering the same, as shown in dotted lines in Fig. 1, when the funnel can be removed from the bottle without dripping or loss of any of the liquid that may have remained therein. If it is desired to arrest the flow of the liquid before the bottle is full, close all but the lower row of air-holes by the band $a^*$; otherwise close the lower holes and the liquid will flow until it reaches and covers the upper holes.

Having thus described my invention, what I claim, and desire to secure by Letters Patent, is—

1. A funnel comprising an outer and inner funnel, provided with an air-space between them, the outer funnel having a spout with an aperture in its lower end, and one or more series of air-holes in its sides, and the inner funnel having a spout part of the lower end of which is closed and part open, said inner funnel adapted to be rotated, and the closed portion of its lower end to cover or uncover the aperture in the spout of the outer funnel, substantially as described.

2. A funnel comprising an outer and an inner funnel separated from each other by an air-space and each having at the lower end of its spout an aperture, the upper edge of one of said funnels provided with a lug, and the upper edge of the other funnel provided with a guideway for said lug, and shoulders forming stops for said lug, substantially as described.

3. A funnel comprising an outer and inner funnel provided with an air-space between them, the outer funnel having a spout provided with one or more series of air-holes in its sides, and means for covering all but one series of said air-holes, an aperture in its lower end and an elastic sleeve on the outside, and the inner funnel having a spout part of the lower end of which is closed and part open, a washer between the end of the spout of the inner funnel and the bottom of the spout of the outer funnel, said inner funnel adapted to rest and be rotated on said washer, and the closed portion of the lower end of its spout to cover and uncover the aperture in the spout of the outer funnel, substantially as described.

4. A funnel comprising an outer and an inner funnel provided with an air-space between them, the outer funnel having a spout with one or more series of air-holes in its sides and a band or bands on said spout adapted to slide and cover all but one series of said air-holes, substantially as described.

In testimony whereof I affix my signature in presence of two witnesses.

CHARLES MANVILLE PRATT.

Witnesses:
E. B. PIERCE,
NATHAN V. WELLER.